July 27, 1971     KENKICHI IZUMI     3,595,757
MULTIPLE EFFECT MULTISECTION FLASH EVAPORATOR
Filed July 16, 1969     3 Sheets-Sheet 1
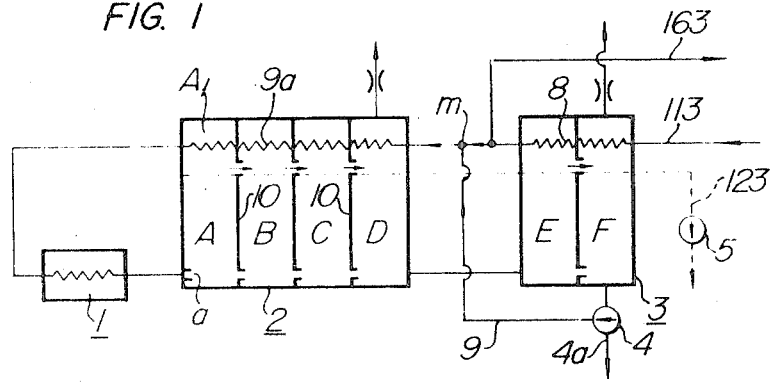
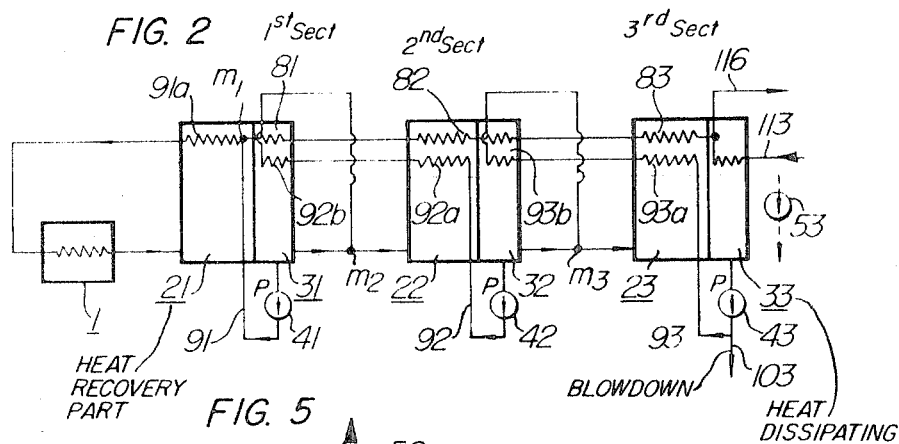
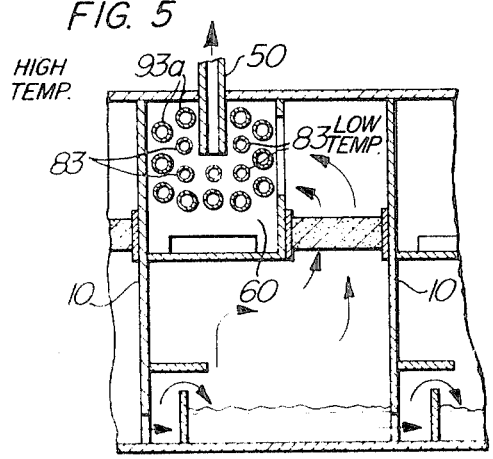
INVENTOR
KENKICHI IZUMI
BY Craig, Antonelli, Stewart & Hill
ATTORNEYS

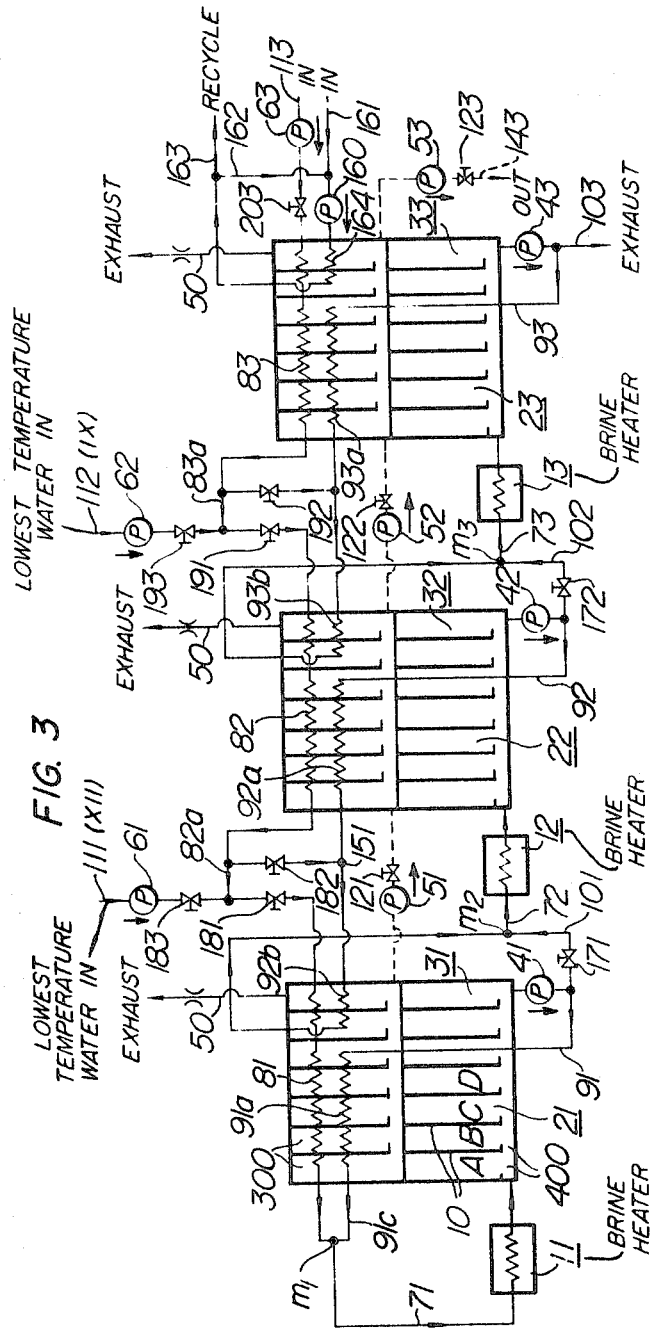

United States Patent Office 3,595,757
Patented July 27, 1971

3,595,757
MULTIPLE EFFECT MULTISECTION FLASH
EVAPORATOR
Kenkichi Izumi, Hitachi-shi, Japan, assignor to Hitachi,
Ltd., Tokyo, Japan
Filed July 16, 1969, Ser. No. 842,305
Claims priority, application Japan, July 19, 1968,
43/50,526
Int. Cl. B01d *3/02, 1/28*
U.S. Cl. 202—173       2 Claims

ABSTRACT OF THE DISCLOSURE

A multiple effect multisection flash evaporator comprising a plurality of effect sections arranged in the order of temperature from a first effect section of highest temperature to a last effect section of lowest temperature and each divided into a number of flash chambers, the majority of said flash chambers constituting a heat recovery section and the minority thereof constituting a heat dissipation section. Each effect section is provided with one brine heater for increasing the flash range of each flash chamber to thereby increase the quantity of vapor produced. The effect sections are each provided with means for disconnecting the effect sections as desired from the system while the remainder of effect sections is operated by accommodating a variation in the quantity of the steam supplied to the system.

---

This invention relates to multisection flash evaporators used for converting brine into fresh water. More particularly, the invention is concerned with an improved multiple effect multisection flash evaporator which permits to obtain fresh water from brine at reduced cost.

Multisection flash evaparators have been widely known as apparatus for economically producing fresh water from brine. One disadvantage of such evaporators lies in the fact that the cost of fresh water produced by such evaporators is relatively high because of scale formation in the brine circulation system, particularly in the brine heater used for heating the brine. Such scale formation takes place when the temperature and concentration of the brine are both high. In an effiort to obviate this problem, proposals have been made to use multiple effect multisection flash evaporators in which the multisection flash evaporator is divided into a plurality of blocks and the concentration of salt in the brine is maintained at a lower level in those vaporization sections in which the temperature of brine is higher and the concentration salt in the brine is maintained at a higher level in those vaporization sections in which the temperature of a brine is lower so that scale formation can be prevented.

Accordingly, an object of the present invention is to facilitate the control of operation of a flash evaporator combined with a thermal or atomic power station into a dual purpose plant for power generation and fresh water production so that the quantity of fresh water produced can be adjusted in conformity with fluctuation in the load of the power station, and also to facilitate control of the flow of brine and increase the vaporization capacity of the plant by increasing the temperature gradient in lower pressure flash sections.

Another object of the invention is to provide a multiple effect multisection flash evaporator which permits to successively separate one effect section after another from the higher temperature side of the system and yet to perform a stable fresh water production operation in the effect sections which are still connected to the system, brine being circulated in each of the separated effect sections independently and operations of scale removal and the like being performed readily therein.

Another object of the invention is to provide a multiple effect multisection flash evaporator in which the temperature of a fresh supply of sea water passing through the condenser chamber of each flash chamber is maintained at a lower level than the temperature of recirculating brine and the condenser tubing for such fresh supply of sea water is disposed in close proximity to the vent pipe of each condenser chamber to cool vapor and facilitate the separation of steam from air and carbon dioxide so as to increase the vent effect of exhausting only air and carbon dioxide for thereby increasing the capacity of the condenser chamber.

Still another object of the invention is to provide a multiple effect multisection flash evaporator which permits to reduce the number of pumps required for withdrawing produced fresh water.

Other objects as well as features and advantages of the invention will become apparent from the description set forth hereinafter when considered in conjunction with the accompanying drawings, in which FIG. 1 is a systematic diagram of a conventional multisection flash evaporator of the recirculation type;

FIG. 2 is a systematic diagram of a conventional multiple effect multisection flash evaporator;

FIG. 3 is a systematic diagram of one embodiment of the multiple effect multisection flash evaporator according to this invention;

FIG. 5 is a detailed sectional view of the condenser chamber showing condenser tubing for a fresh supply of sea water arranged in close proximity to the vent pipe.

Figure 4:
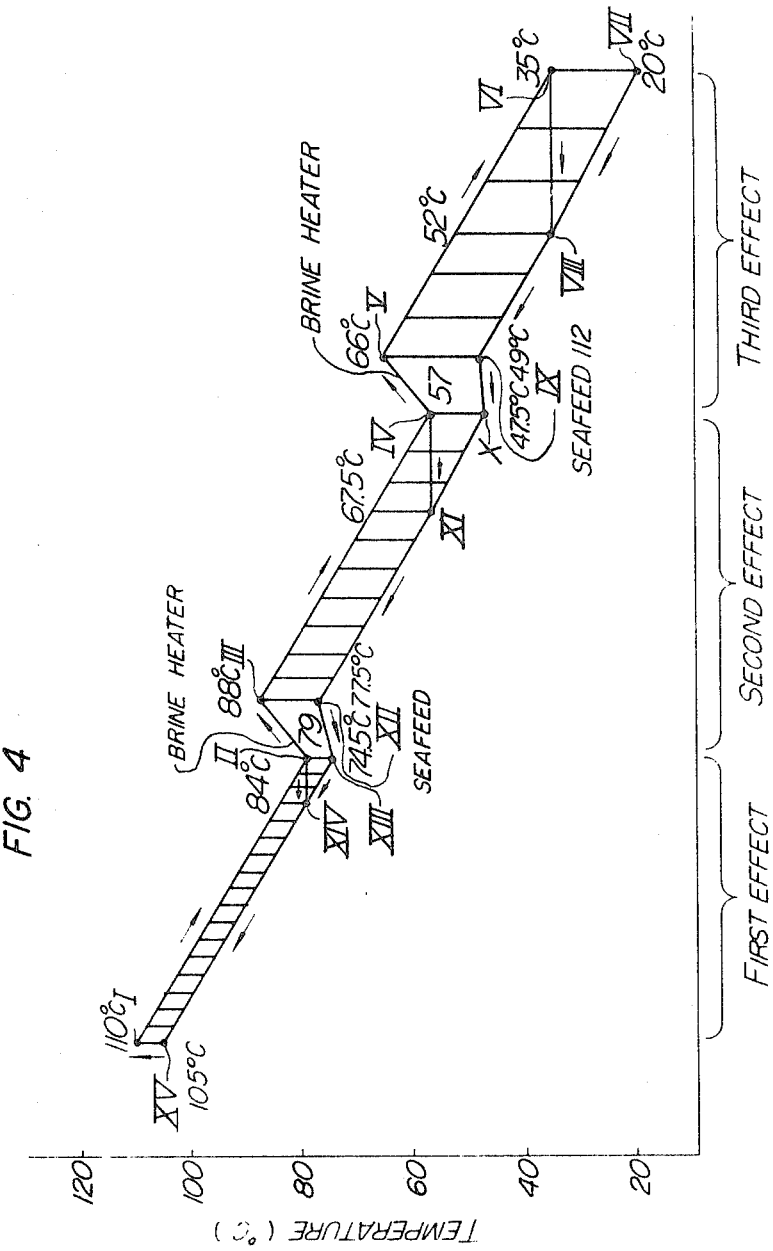
FIG. 4 is one example of temperature diagrams in the multiple effect multisection flash evaporator shown in FIG. 3.

In FIG. 1 the conventional flash evaporator of the recirculation type consists of a brine heater 1, heat recovery section 2 and heat dissipation section 3. Brine is heated to a predetermined temperature by said brine heater 1 and flashed through an inlet structure $a$ including an orifice into an initial flash chamber A of the heat recovery section 2 in which the highest temperature and pressure prevail. The pressure in said flash chamber A is kept at a lower level than the saturation pressure corresponding to the temperature of the brine flashed into the flash chamber A, so that a part of the brine is vaporized and the vapor is cooled and condensed by condenser tubing $9a$ extending through a condenser chamber $A_1$ provided in the upper portion of the flash chamber A. The rest of the brine which remains unvaporized in the flash chamber A is flashed into a lower pressure flash chamber B separated from the chamber A by a partition wall 10. A part of the brine flashed into the chamber B is vaporized, and the rest is flashed into a chamber C. This process is repeated in chambers C and D, and the portion of brine which remains unvaporized in the chamber D is flashed into a flash chamber E of the heat dissipation section 3. The process described above is repeated in the chambers E and F of the heat dissipation section 3.

The portion of the brine which remains unvaporized in the final flash chamber F is pumped by a recirculation pump 4 into a line 9 from which the brine is passed through condenser tubing $9a$ extending through condenser chambers of the flash chambers A, B, C and D to effect condensation of the vapor produced in each flash chamber of the heat recovery section 2. At the same time, the brine recovers latent heat of condensation to increase its temperature and heater 1 is again applied to the brine.

In order to prevent scale formation due to a rise in the concentration of salt in the recirculated brine above a predetermined level in the flash evaporator of the type described, a part of the recirculated brine is removed from the system through a line 4a and a fresh supply of sea water is introduced into the recirculation circuit 9 at a point m. That is, an additional supply of sea water of low temperature is passed through a line 113 into condenser tubing 8 for effecting condensation of the vapor generated in the heat dissipation section 3. The major portion of said fresh supply of sea water is removed from the system through a line 163, with the remainder being introduced into the brine recirculation circuit through said point m. The fresh water produced is taken out of the system through a line 123 and a fresh water pump 5. The multisection flash evaporator of the recirculation type described above has a disadvantage in that the recirculated brine supplied to the brine heater 1 has a high concentration of salt (generally 1.7 to 2 times as high as the concentration of salt in ordinary sea water) and scale formation tends to take place in the brine heater, so that the heat transfer effect of the heater is reduced and heat consumption is increased. This results in an increased cost for producing fresh water.

In order to obviate the aforementioned disadvantage, various proposals have heretofore been made. One example embodying such proposals is a multiple effect multisection flash evaporator shown in FIG. 2. This evaporator comprises a brine heater 1, a heat recovery section 21 and heat dissipation section 31 making up a first effect section, a heat recovery section 22 and heat dissipation section 32 making up a second effect section and a heat recovery section 23 and a heat dissipation section 33 making up a third effect section. The major portion of the brine which remains unvaporized in the heat dissipation section 31 of the first effect section is returned by a recirculation pump 41 to the brine heater 1 through a recirculation circuit 91 and condenser tubing 91a extending through the heat recovery section 21 of the first effect section. The remainder of the brine which remains unvaporized in the heat dissipation section 31 of the first effect section is combined at a point $m_2$ to the recirculating brine of the second effect section which is supplied to the heat recovery section 22 of the second effect section for supplementing the brine supplied to the second effect section.

An additional supply of sea water is introduced at a point $m_1$ into the recirculation circuit 91 of the first effect section through condenser tubing 83, 82 and 81.

A part of the brine which remains unvaporized in the second effect section is used for supplementing the brine supplied to the third effect section and combined at a point $m_3$ to the recirculating brine of the third effect section which is supplied to the heat recovery section 23 of the third effect section. The remainder or major portion of the brine which remains unvaporized in the second effect section is returned by a recirculating pump 42 through a line 92 to condenser tubing 92a extending through the heat recovery section 22 of the second effect section to effect heat recovery and increase the temperature of the brine.

The brine passing through condenser tubing 92a is introduced into condenser tubing 92b to further increase its temperature and combined at the point $m_2$ to the brine supplied from the first effect section to the second effect section by flash into the heat recovery section 22 thereof. A process substantially similar to the process set forth hereinabove with reference to the second effect section takes place in the third effect section except for the fact that the majority of the brine discharged through the last evaporation chamber of the third effect section is recirculated by a recirculation pump 43 and the remainder is removed from the system through a line 103.

In the conventional multiple effect multisection flash evaporator described in some detail hereinabove, the brine in the brine heater of the first effect section in which the temperature is highest has a lowest concentration of salt, and the temperature of the brine becomes increasingly lower in the condenser tubing 92b and 93b in the second effect section and the third effect section respectively for heating the brine in the respective effect section which has increasingly higher concentration of salt. This arrangement can effectively prevent scale formation.

The multisection flash evaporator of the recirculation type and multiple effect multisection flash evaporator which have either been publicly used or made public have been described in detail in order to enable the present invention to be better understood by comparison. An embodiment of the multiple effect multisection flash evaporator according to this invention representing an improvement in conventional flash evaporators which exhibits high performance and lends itself to ready control of operation will now be explained in detail.

FIG. 3 is a systematic diagram of one embodiment of the multiple effect multisection flash evaporator according to this invention which is of the triple effect type. The flash evaporator shown is divided into a first effect section, second effect section and third effect section, said first effect section comprising a brine heater 11, heat recovery section 21 and heat dissipation section 31, said second effect section comprising a brine heater 12, heat recovery section 22, and heat dissipation section 32, and said third effect section comprising a brine heater 13, heat recovery section 23 and heat dissipation section 33. The heat recovery section and heat dissipation section of each effect section each comprise a number of flash chambers separated from one another by a partition wall 10. Each of said flash chambers is provided with a condenser chamber 300 and an inlet structure 400 having an orifice for controlling the flow of brine. Generally, the majority of the flash chambers of each effect section make up the heat recovery section and the rest or minor portion thereof make up the heat dissipation section of the respective effect section. The flash chambers constituting the heat recovery section are maintained at relatively high temperatures and those constituting the heat dissipation section are maintained at relatively low temperatures.

According to the present invention, each effect section comprises a brine heater so that it is possible to increase greatly the rate of reduction of temperature of the brine in each flash chamber. This rate of reduction of temperature of the brine is generally referred to as a flash range. Generally, the greater the flash range, the larger is the quantity of vapor produced. Moreover, this invention permits to operate the evaporator satisfactorily even in cases where there are large fluctuations in the quantity of vapor supplied to the brine heaters for heating the brine. Furthermore, the condensers disposed in the flash chambers can have an increased capacity as compared with condensers of prior art flash evaporators. In addition, the number of pumps required for delivering fresh water produced can be reduced.

The operation of the flash evaporator shown in FIG. 3 will now be described. Assuming that a sea water bypassing valve 182 of the second effect section and a sea water bypassing valve 192 of the third effect section are closed, a supply of sea water introduced into this flash evaporator through a sea water supply line 113 is pumped by a sea water pump 63 of the third effect section and flows through condenser tubing 83 extending through the condenser chambers of the flash chambers of the heat dissipation section 33 and heat recovery section 23 of the third effect section to be preheated. An additional supply of sea water of lower temperature introduced into the flash evaporator through a sea water supply line 112 of the second effect section is pumped by a sea water pump 62 of the second effect section and combined to said preheated supplementary sea water from the third effect section. The combined stream of supplementary sea water passes through condenser tubing 82 extending through the condenser chambers of the flash chambers of the heat dissipation section 32 and heat recovery section 22 of the second effect section to be preheated. A further supply of sea water of lower temperature introduced into the flash evaporator through a sea water supply line 111 of the first effect section is pumped by a sea water pump 61 of the first effect section and combined with said preheated combined stream of supplementary sea water from the second effect section. The stream of combined sea water passes through condenser tubing 81 extending through the condenser chambers of the flash chambers of the heat dissipation section 31 and heat recovery section 21 of the first effect section to be preheated. The preheated sea water is combined at a point $m_1$ with recirculating brine 91c delivered through a recirculation circuit. The preheated sea water and recirculating brine are combined to form brine 71 and introduced into the first effect section, after being heated at the brine heater 11 of the first effect section. The brine 71 is then introduced into the initial flash chamber A of the heat recovery section 21 of the first effect section and a portion of the brine 71 is vaporized therein. The remainder of the brine which remains unvaporized is successively passed through a second flash chamber B, third flash chamber C, fourth flash chamber D . . . which are maintained successively at a lower temperature so that a portion of the brine is vaporized in each flash chamber. The brine which remains unvaporized in the last flash chamber of the first effect section is pumped by a recirculation pump 41 of the first effect section into a circuit 91 for recirculation to the flash inlet of the first effect section and the remainder is passed through a line 101 and combined with recirculating brine via line 92 of the second effect section as a stream of brine 72 at a point $m_2$. The combined stream of brine 72 is heated to a predetermined temperature by the brine heater 12 of the second effect section and introduced into the initial flash chamber of the second effect section. Then, the brine 72 passes through various flash chambers of the second effect section and a portion thereof is vaporized in each flash chamber till the brine reaches the final flash chamber of the second effect section. The brine which remains unvaporized in the last flash chamber of the second effect section is pumped by a recirculation pump 42 of the second effect section into a circuit 92 for recirculation to the condenser tubing 92a extending through the condenser chambers of the heat recovery section 22 of the second effect section and condenser tubing 92b extending through the condenser chambers of the heat dissipation section 31 of the first effect section to be preheated. The preheated brine is combined at the point $m_2$ with brine supplied from the last flash chamber of the first effect section through a circuit 101 and conducted to the initial flash chamber of the second effect section via preheater 12. On the other hand, the rest of the brine pumped by the recirculation pump 42 of the second effect section is passed through a line 102 and combined with recirculating brine arriving via 93 from the third effect section, at a point $m_3$.

This combined stream of brine is heated by the brine heater 13 of the third effect section and introduced into the initial flash chamber of the third effect section. The brine which successively passes through the several flash chambers of the third effect section while being vaporized in part in each flash chamber is discharged through the outlet of the last flash chamber of the third effect section. The brine discharged is pumped by a brine recirculation pump 43 of the third effect section, and a portion thereof is discarded as waste water through a line 103 but the remaining major portion thereof is recirculated through a circuit 93 to condenser tubing 93a extending through the condenser chamber of the heat recovery section 23 of the third effect section and condenser tubing 93b extending through the condenser chambers of the heat dissipation section 32 of the second effect section and combined at the point $m_3$ with the brine supplied via 102 from the last flash chamber of the second effect section to the third effect section.

Cooling sea water supplied through a line 161 is pumped by a pump 160 into condenser tubing 164 extending through the heat dissipation section 33 of the third effect section. The cooling sea water reduces the temperature in the flash chambers of the heat dissipation section of the third effect section and its temperature is raised during this process. The major portion of the cooling sea water which has thus had its temperature raised by absorbing heat is returned to the sea through a line 163, but the remainder is reintroduced through a line 162 into the line 161 and combined with a fresh supply of said cooling sea water so as to slightly increase the temperature of cooling sea water introduced into condenser tubing 164 above the temperature of an additional supply of sea water introduced into the sea water condenser tubing 83 of the second and third effect sections. A sea water supply system composed of the condenser tubing 83, 82 and 81 for the various effect sections receives a supply of cold sea water at the entrance to each effect section through a sea water supply device for each effect section which comprises the sea water supply pipe 113, 112 or 111, the sea water supply pump 63, 62 or 61 and a sea water supply valve 183, 193 or 203. Accordingly, the supply of sea water in each effect section is maintained at a lower temperature level than the recirculating brine in the same effect section. For example, supplementary sea water passing through the condenser tubing 83 extending through various flash chambers is maintained at a lower temperature level than the recirculating brine passing through the condenser tubing 93a extending through the same flash chambers. It is thus possible to increase the vent effect by arranging the condenser tubing for the supplementary sea water in close proximity to a vent pipe of the condenser chamber of each flash chamber of each effect section of the flash evaporator as shown in FIG. 5.

In FIG. 5, 50 is a vent pipe for exhausting uncondensable gases from a condenser chamber, 60, 93a is the condenser tubing through which recirculating brine of higher temperature flows, and 83 is the condenser tubing through which a supply of sea water of lower temperature flows. The vapor in the condenser chamber 60 is cooled and condensed efficiently by the tubing 83 so that only the uncondensable gasses are exhausted through the vent pipe 50.

Fresh water produced by the condenser of each effect section is withdrawn from the system through a fresh water take-out valve 121, 122 or 123 and by a fresh water pump 51, 52 or 53 of each effect section. The fresh water withdrawn from each effect section may be used as it stands or introduced into the condenser chambers of effect sections of lower temperature for recovering heat by heat exchange. Moreover, if the condenser chamber of the last flash chamber of a higher temperature effect section is connected to the condenser chamber of a flash chamber of a lower temperature effect section where the pressure is lower than in said last section flash chamber of said higher temperature effect section, then it is possible to eliminate the fresh water pump of said effect section of higher temperature without interfering with the withdrawal of produced fresh water from said effect section.

FIG. 4 is a diagram showing one example of temperatures in various flash chambers of the effect sections of the multiple effect multisection flash evaporator illustrated in FIG. 3. In the diagram of FIG. 4, the vertical axis shows temperatures in various flash chambers of the effect sections and the horizontal axis indicates the direction of flow of brine from the initial flash chamber to the last flash chamber of each effect section. The Arabic numerals in the diagram designate temperatures of brine (° C.) in respective portions (designated by Roman numerals) in the system. For example, the brine is heated by the brine heater of first section from 105° C.

at XV to 110° C. at I, and then passes through various flash chambers of the first effect section while undergoing flash vaporization in each flash chamber and thereby gradually reducing its temperature as indicated by the arrow I–II. The temperature of the brine remaining unvaporized in the last flash chamber of the first effect section is 79° C. as shown at II. The major portion of the unvaporized brine is recirculated to the condenser tubing of the first effect section as indicated by the arrow II–XIV where it is preheated and gradually increases its temperature as shown by the arrow XIV–XV and combined at the point $m_1$ shown in FIG. 3 with the brine supplied to the initial flash chamber. The temperature of the combined stream of brine is 105° C. as shown at XV in FIG. 4. The brine is then heated to 110° C. by the brine heater 11 as indicated by the arrow XV–I and circulated as set forth previously. The temperature of the brine passing through the recirculating brine condenser tubing 91a of FIG. 3 is sligthly higher than the temperature of supplementary sea water in the condenser tubing 81 through which a fresh supply of sea water flows. However, FIG. 4 shows an average of the two temperatures indicated by the arrow XIV–XV.

The remainder of the unvaporized brine in the last flash chamber of the first effect section is combined at the point $m_2$ shown in FIG. 3 with the recirculating brine of the second effect section of substantially same temperature and heated by the brine heater 12 of the second effect section from 79° C. to 88° C. as shown by the arrow II–III before being introduced into the second effect section. The brine successively passes through various flash chambers of the second effect section while undergoing flash vaporization in each flash chamber and thereby gradually reducing its temperature as indicated by the arrow III–IV. The temperature of the brine remaining unvaporized in the last flash chamber of the second effect section is 57° C. as shown at IV. The major portion of the unvaporized brine is recirculated to the condenser tubing of the second effect section as indicated by the arrow IV–XI where it is preheated and gradually increases its temperature as shown by the arrow XI–XII. It will be seen that the temperature of the brine in the condenser tubing is reduced as indicated by the arrow XII–XIII. This indicates that since an additional supply of cold sea water introduced into the system through the sea water supply line 111 of the first effect section is added to the supplementary sea water released from the condenser tubing 82 as explained previously with reference to FIG. 3, the average temperature of the brine released from the condenser tubing of the second effect section is reduced. The recirculating brine in the second effect section is further preheated by the condenser tubing of the heat dissipation section 31 of the first effect section and it temperature is raised as shown by the arrow XIII–XIV to a level substantially equal to that of the temperature of the brine remaining unvaporized in the final flash chamber of the first effect section. They are combined to each other at the point $m_2$ shown in FIG. 3.

The brine remaining unvaporized in the last flash chamber of the second effect section is combined with the recirculating brine in the third effect section at the point $m_3$ shown in FIG. 3 and preheated by the brine heater 13 of the third effect section to increase its temperature as shown by the arrow IV–V before being introduced into the initial flash chamber of the third effect section. The brine introduced into the initial flash chamber of the third effect section passes through various flash chambers of the third effect section while undergoing flash vaporization in each flash chamber and reducing its temperature till its temperature is reduced to a level shown at VI. The majority of the unvaporized brine in the last flash chamber of the third effect section increases its temperature again as it is recirculated as indicated by the arrow VI–VIII–IX. The lowering of the temperature of the brine between IX and X is accounted for by the fact that an additional supply of cold sea water introduced into the system through the supplementary sea water supply line 112 of the second effect section is added to the supply of sea water released from the condenser tubing as explained with reference to the second effect section. The rise in the temperature of the brine shown by the arrow VII–VIII indicates a rise in the temperature of the brine in the condenser tubing of the heat dissipation section 33 of the third effect section.

Generally, the quantity of vapor produced in a flash evaporator is substantially proportional to the difference between the temperature of the brine in the inlet of the flash evaporator and the temperature of the brine in the outlet thereof (which is generally referred to as a flash range). Let us now compare the quantity of vapor $Q_1$ produced by the conventional multisection flash evaporator shown in FIG. 1 or FIG. 2 with the quantity of vapor $Q_2$ produced by the multisection flash evaporator embodying the present invention by assuming that the temperature of the brine in the inlet is 110° C. and that of the brine in the outlet is 35° C. In the flask evaporator according to this invention, the brine introduced into each effect section is heated in the inlet by a brine heater not only in the first effect section but also in the second and third effect sections as shown in FIGS. 3 and 4, so that the quantity of vapor produced can be increased (it being assumed that the flow rate of brine passing through the flash chambers of the conventional flash evaporator is equal to that of the brine passing through the flash chambers of the flash evaporator embodying this invention). More specifically, in the flash evaporator of this invention, the flash range of the first effect section is 110°–79° C., the flash range of the second effective section is 88°–57° C., and the flash range of the third effect section is 66°–35° C., as can be clearly seen from FIG. 4. On the contrary, the total flash range of the conventional multisection flash evaporator is 110°–35° C. The ratio $r$ of the quantity of vapor $Q_2$ produced by the multiple effect multisection flash evaporator according to this invention to the quantity of vapor $Q_1$ produced by the conventional multisection flash evaporator can be obtained from the following formula:

$$r = \frac{Q_2}{Q_1} = \frac{(110-79)+(88-57)+(66-35)}{(110-35)}$$

$$= \frac{93}{75} = 1.24 \quad (1)$$

From the foregoing, it will be evident that the output power of the mutiple effect multisection flash evaporator embodying the present invention is 24% higher than the output power of the multistage flash evaporator of the prior art. In making the above calculation, it is assumed that the quantity of brine circulating through various flash chambers is substantially constant in all the flash evaporators under consideration. The result of calculation shown in the Formula 1 indicates that the present invention permits to reduce the quantity of circulating brine required for producing a given quantity of vapor. That is, the invention permits to obtain an overall small size in a multiple effect multisection flash evaporator for a given capacity. Although each effect section of the multiple effect multisection flash evaporator embodying this invention has a brine heater of its own, there is substantially no disadvantage of scale formation on the heat transfer surface because of the fact that the temperature used for heating the brine is low.

Generally, it is advantageous to increase the number of sections of a flash evaporator because the quantity of fresh water produced per unit calorie consumed by the brine heater is increased. This is well known and no detailed explanation will, therefore, be necessary. However, the temperature of the brine in the inlet of the flash evaporator must be maintained at about 120° C. in order to prevent scale formation on the heat transfer surface of the brine heater. The temperature of the brine in the outlet of the flash evaporator is generally about 30° C. although it may vary depending on the temperature of sea water used for cooling the condensers attached to the flash evaporator. Since there are limits to the maximum and minimum temperatures of brine in the flash evaporator, an increase in the number of sections of the flash evaporator results in a reduction of the flash range for each section. This means that the difference in temperature and hence in pressure between the adjacent flash chambers is reduced and that consequently it becomes difficult to flash the brine efficiently. This is particularly the case with lower pressure flash chambers in which the temperature of brine is lower (for example, the saturation pressure difference of water corresponding to the temperature difference of 3° C. in the neighborhood of 120° C. is 20 cm. of water column while the saturation pressure difference of water for the same temperature 3° C. in the neighborhood of 30° C. is only 0.7 cm.). In the multiple effect multisection flash evaporator embodying this invention, a brine heater is provided in each effect section to increase the temperature of brine in the inlet of each effect section. This permits to increase the pressure differential between the adjacent flash chambers of the effect section and to readily effect control of the flow rate of the brine (particularly in the lower pressure flash chambers).

An additional advantage of the multile effect multisection flash evaporator embodying this invention lies in the fact that when there are large fluctuations in the quantity of heat for heating brine supplied to the flash evaporator, the operation of the flash evaporator can be performed efficiently in conformity with an increase or reduction in the quantity of the steam supplied. Generally, a flash evaporator is advantageously combined with a thermal or atomic power station into a dual purpose plant for power generation and fresh water production in order to reduce cost for producing fresh water. Since the load of the power station shows fluctuations due to changes in the demand for electric power, there are corresponding variations in the quantity of steam for heating brine supplied to the flash evaporator. When the quantity of the steam supplied is reduced, the conventional multisection flash evaporator shown in FIG. 1 or 2 is operated such that the quantity of circulating brine is reduced in conformity with a reduction in the quantity of the steam supplied in order to prevent a reduction in temperature differential between the adjacent flash chambers (because a reduction in temperature differential between the adjacent flash chambers results in the brine not flowing readily). However, this method of operation has its limits. More specifically, the inlet structure of each flash chamber is constructed such that the brine is flashed efficiently and the vapor produced and the brine remaining unvaporized can be well separated from each other. The optimum construction of the entrance structure may vary depending on the temperature differential between the adjacent flash chambers and the quantity of circulating brine. Therefore, it is not desirable that the flash evaporator be operated in such a condition in which the quantity of circulating brine and the temperature differential are deviated greatly from those for which the inlet structure is designed.

On the contrary, the present invention makes it possible to accommodate great variations in the quantity of the steam supplied for heating brine and to operate the flash evaporator efficiently and in a stable manner at all times. One example of operation of the multisection flash evaporator according to this invention under such condition will be explained with reference to the flash evaporator of triple effect type shown in FIG. 3. Let us assume that there has occurred a great reduction in the quantity of steam supplied for heating the brine. When this is the case, the first effect section is shut off and fresh water is produced by operating only the second and third effect sections. That is, the first effect section is operatively disconnected from the system by closing a communication valve 171 mounted on the line 101 for supplying to the second effect section a portion of the brine released from the final chamber of the first effect section, a communication valve 181 mounted on a connecting line 82a between the condenser tubing 81 for the supply of sea water extending through the first effect section and the condenser tubing 82 for the supply of sea water extending through the second effect section, a valve 183 for supplying sea water to the condenser tubing 81 of the first effect section and a fresh water take-out valve 121 of the first effect section shown in FIG. 3. Then, the sea water bypassing valve 182 for the second effect section connecting said connection line 82a to the exit of the condenser tubing 92a for the brine recirculating through the second effect section is opened so as to combine at a point 151 the supply of sea water flowing through the supplementary sea water condenser tubing 82 of the second effect section with the brine recirculating through the second effect section. By shutting off the first effect section in this way, it is possible to continue operation in a stable manner by using a reduced quantity of steam supplied for heating brine without substantially varying the quantity of brine circulated through the system and without substantially reducing the temperature differential between the adjacent flash chambers.

Upon further reduction in the quantity of steam supplied for heating the brine, the second effect section may also be shut off. The effect sections being shut off can be subjected to pickling during the shut-off period because they are independent of the system as shown in FIG. 3. The first effect section which is oftener shut off than other effect sections happens to be susceptible to scale formation because of high temperature of the brine introduced thereinto, requiring to effect pickling periodically. The present invention is advantageous because it suits the condition under which the multiple effect multisection flash evaporator is operated.

From the foregoing description, it will be appreciated that the multiple effect multisection flash evaporator embodying this invention offers many advantages. It is highly efficient and produces a high output power. It can continue a stable operation by accommodating fluctuations of large order in the quantity of the steam delivered for heating the brine caused by variations in the operation conditions of the heat supply source. It can readily control the rate of flow of the circulating brine by increasing the temperature gradient in each effect section. It can achieve high vent effect and increase the capacity of condensers by arranging condenser tubing for supplementary sea water of low temperature in the vicinity of the vent opening in each condenser chamber. It permits to operatively disconnect a high pressure flash section or stages from the system so that pickling and other operations can readily be performed for removing formed scale and for other purposes. Last but not least important is the fact that the fresh water take-out pump of a higher temperature effect section can be eliminated by introducing fresh water produced in the last flash chamber of said higher temperature effect section into a flash chamber of a lower temperature effect section in which a pressure lower than the pressure in said final flash chamber of said higher temperature effect section prevails.

What we claim is:

1. A multiple effect multisection flash evaporator for producing fresh water from brine comprising a plurality of effect sections arranged in the descending order of their temperatures and adapted to operate simultaneously in succession from a higher temperature effect section to a lower temperature effect section, each of said effect sections comprising a number of flash chambers in which the temperature becomes successively lower in going from an initial flash chamber to a last flash chamber, each of said effect sections being further provided with a feed preheating and vapor condensing tube set and two supplementary brine reheating tube sets, one of the latter being in the heat recovery part feeding into the below named heat dissipating part of the next upstream effect section and the other one being in the below named heat dissipating part receiving recycle brine from the heat recovery set of the adjacent downstream section, said effect sections each having a connection value for the feed preheating set for each effect section, a sea water bypassing valve connected into the junctions of the two supplementary tube sets for each effect section, a sea water feed supply valve for each effect section connected into the junctions of the feed preheating sets of adjacent sections, a connection valve for additional feed brine for each effect section feeding into the last named junction, and a fresh water takeout valve for each effect section for removing condensate, each of said flash chambers being provided with a vapor condensing chamber and a brine feed entrance structure, each of said effect sections being divided into a heat recovery part and a heat dissipation part, said heat recovery part being composed of the majority of the flash chambers of higher temperatures of each effect station and said heat dissipation part being composed of the minority of the flash chambers of lower temperatures of each effect section, the first effect section of highest temperature being provided with a brine heater for heating the brine feed prior to being supplied to said first effect section, each effect section being provided with a fresh water pump for taking out fresh water produced in the preceding and its own effect sections, wherein at least one additional brine heater is arranged between each two adjacent effect sections following the first and acts as a preheater for the one of said adjacent two effect sections which is disposed downstream of said additional brine heater.

2. A multiple effect multisection flash evaporator for producing fresh water from brine comprising a plurality of effect sections arranged in the descending order of the temperatures and adapted to operate simultaneously in succession from a higher temperature effect section to a lower temperature effect section, each of said effect sections comprising a number of flash chambers in which the temperature becomes successively lower in going from an initial flash chamber to a last flash chamber, each of said flash chambers being provided with a vapor condensing chamber and a brine feed entrance structure, the vapor condensing chamber comprising feed sea water preheating and flash vapor condensing tubing arranged in close proximity to a non-condensable gas vent pipe of the condensing chamber attached to each of said number of flash chambers making up each said effect section, and an additional feed sea water supply line for each effect section mounted in the inlet of said feed preheating and vapor condensing tubing for each effect section, each of said effect sections being divided into a heat recovery part and a heat dissipation part, said heat recovery part being composed of the majority of the flash chambers of higher temperatures of each effect section and said heat dissipation section being composed of the minority of the flash chambers of lower temperatures of each effect section, the first effect section of highest temperature being provided with a brine heater for heating the brine feed prior to being supplied to said first effect section, each effect section being provided with a fresh water pump for taking out fresh water produced in the preceding and its own effect sections, wherein at least one additional brine heater is arranged between each two adjacent effect sections following the first and acts as a preheater for the one of said adjacent two effect sections which is disposed downstream of said additional brine heater.

References Cited

UNITED STATES PATENTS

| | | | |
|---|---|---|---|
| 3,391,062 | 7/1968 | Tidball | 159—2MSX |
| 3,476,654 | 11/1969 | Sieder | 159—2MSX |

NORMAN YUDKOFF, Primary Examiner

J. SOFER, Assistant Examiner

U.S. Cl. X.R.

159—2MS